Feb. 21, 1956 — C. O. GRINER — 2,735,353
BUTTERFLY DAMPER

Filed May 11, 1953 — 2 Sheets-Sheet 1

INVENTOR
Clarence O. Griner
BY Roy A. Plant
ATTORNEY

Feb. 21, 1956
C. O. GRINER
2,735,353
BUTTERFLY DAMPER
Filed May 11, 1953
2 Sheets-Sheet 2
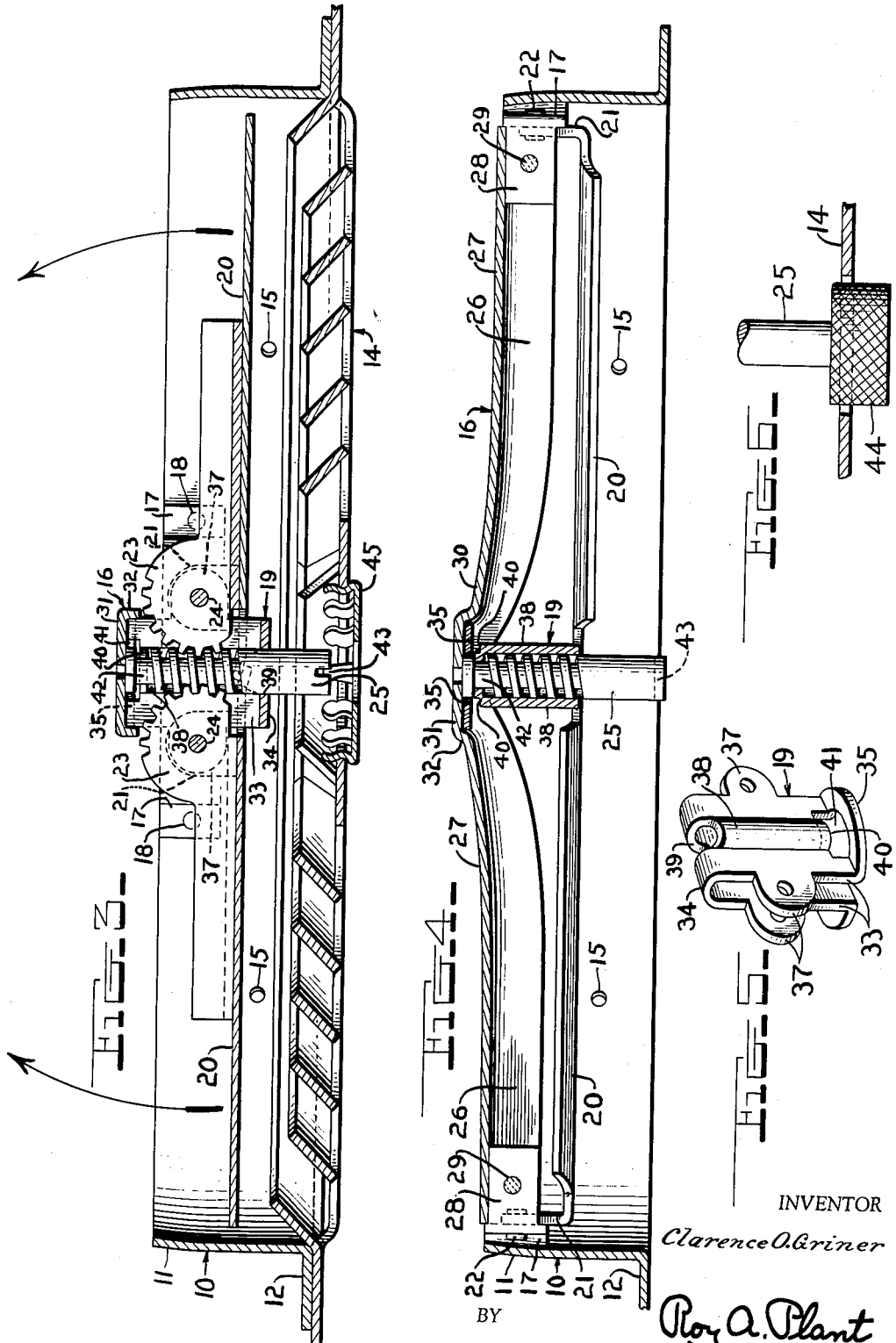
INVENTOR
Clarence O. Griner
BY Roy A. Plant
ATTORNEY 2,735,353

BUTTERFLY DAMPER

Clarence O. Griner, Ceresco, Mich., assignor to United States Register Company, Battle Creek, Mich., a corporation of Michigan Application May 11, 1953, Serial No. 354,315

12 Claims. (Cl. 98—40)

The present invention deals broadly with dampers, and in its more specific phases to a ceiling outlet having a pair of adjustable butterfly dampers.

Air outlet ducts for venting air from rooms and halls are commonly provided with so-called ceiling outlets for controlling the amount of air discharged into such outlet ducts, and such ceiling outlets almost universally use a single butterfly damper although a double butterfly damper has been proposed but which proved cumbersome and not designed for use as a ceiling outlet. All dampers of this general type have heretofore required rather bulky and cumbersome mounting and operating means for the butterfly damper or dampers, with the result that said means choked off an objectionably large portion of the area which would otherwise be available for air flow. Moreover, they have been quite frequently of a construction which permits objectionable butterfly flutter with accompanying wear and noise. It was a recognition of these difficulties and shortcomings of the prior constructions which led to the conception and development of the present invention.

The present invention is designed to overcome the above objections and at the same time to provide an unusually simple, inexpensive, attractive, and yet an effective and durable damper.

In carrying out the above ends, a further object is to provide a slender mounting bar for two butterfly dampers of semi-disk type, said bar extending diametrically across a pipe connector to be mounted in a ceiling opening and restricting the air flow only to an infinitesimal extent.

A still further object is to provide the ends of the diametrical bar with lateral lugs secured to the pipe connector to rigidly mount said bar, said lugs being also instrumental in pivotally connecting the butterfly dampers with said bar.

Another object is to provide a novel construction in which the aforesaid diametrical bar also supports a manually operable adjusting element for effecting opening or closing of the dampers as required.

Another object is to provide a damper assembly having a pair of butterfly valves of semi-disk form hingedly mounted at their adjacent edges both having a stiffening member with a gear segment meshing with a worm gear, the rotation of which simultaneously opens or closes said butterfly valves, and holds same in adjusted position.

Yet another object is to provide the aforesaid adjusting element in the form of a worm gear and to provide each of the dampers with a toothed segment meshing directly with said worm gear, thereby producing an unusually small and compact damper adjusting means which presents little interference to air flow.

A further object is to provide a novel bracket for mounting the worm gear on the aforesaid diametrical bar and for pivotally mounting the segments of the butterfly dampers to hold such segments in mesh with said worm gear.

Another object is to form the diametrical bar from a sheet metal stamping and to provide this stamping with a mounting portion for the aforesaid bracket.

Yet another object is to form the bracket from a novel sheet metal stamping.

The above objects, carried into effect, provide an unusually simple yet a very rugged construction which may be expeditiously manufactured and profitably marketed at a reasonable price, and which will be free from prior objections.

Still further objects and advantages of the present invention will appear as the description proceeds.

To the accomplishment of the foregoing and related ends, the invention, then, consists of the damper means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

Figure 3 is an enlarged diametrical section on line 3—3 of Figures 1 and 2, the two butterfly dampers being shown in closed position.

Figure 4 is a diametrical section on line 4—4 of Figures 1 and 2, also showing the two butterfly dampers closed, the grill being omitted to avoid needless duplication of illustration.

Figure 5 is an inverted perspective view of the worm-mounting bracket.

Figure 6 is a detail view showing a slight modification.

Figure 1:
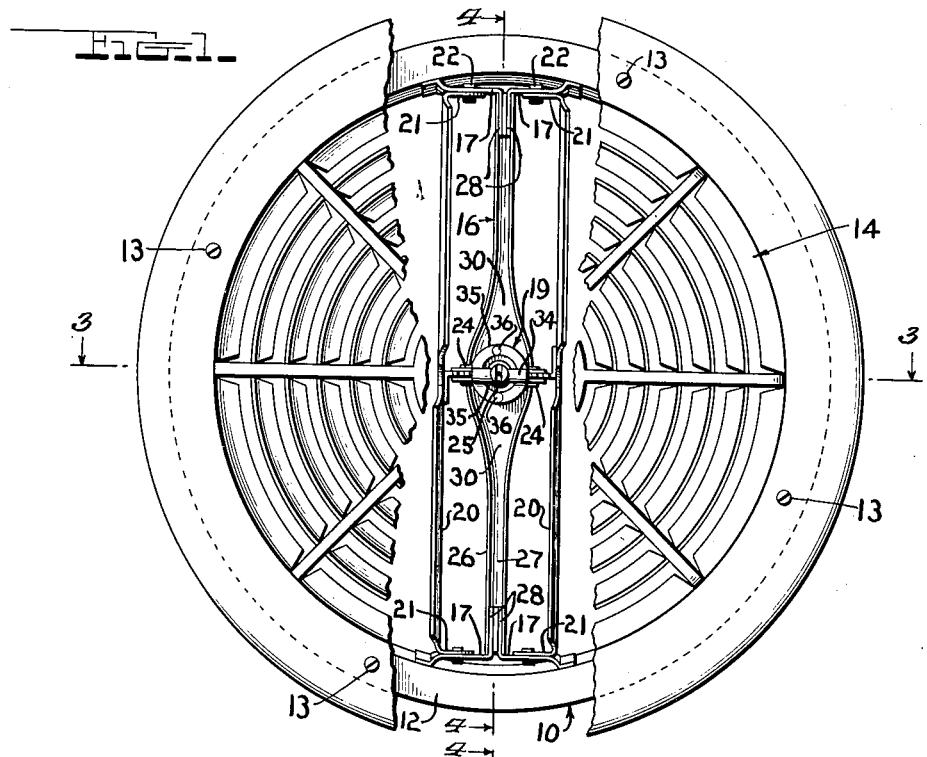
Figure 1 is a bottom plan view of the improved damper with a portion of the grill broken away, the two butterfly dampers being shown in fully open position.

The damper assembly shown in the drawings has proven in use to be advantageous from all standpoints and will be rather specifically described to facilitate understanding its construction and operation. However, it is to be understood that some variations may be made to the assembly without departing from the spirit and scope of the present invention.

A pipe connector 10, Figure 3, preferably in the form of a stamped sheet metal ring, is provided, said pipe connector having a side wall 11 for reception in a ceiling opening or end of a duct (not shown), and also having a flange 12 to be secured against the ceiling by screws or the like (not shown). Attached to the lower side of the flange 12 by screws 13, Figure 1, is a grill 14 which may be of any suitable form, a preferred one being shown and which is of one piece construction. The side wall 11 is adapted for reception in the end of a vent pipe (not shown) and may well have openings 15, Figures 3 and 4, to receive fasteners for securing same to the end of said pipe in conventional manner.

Figure 2:
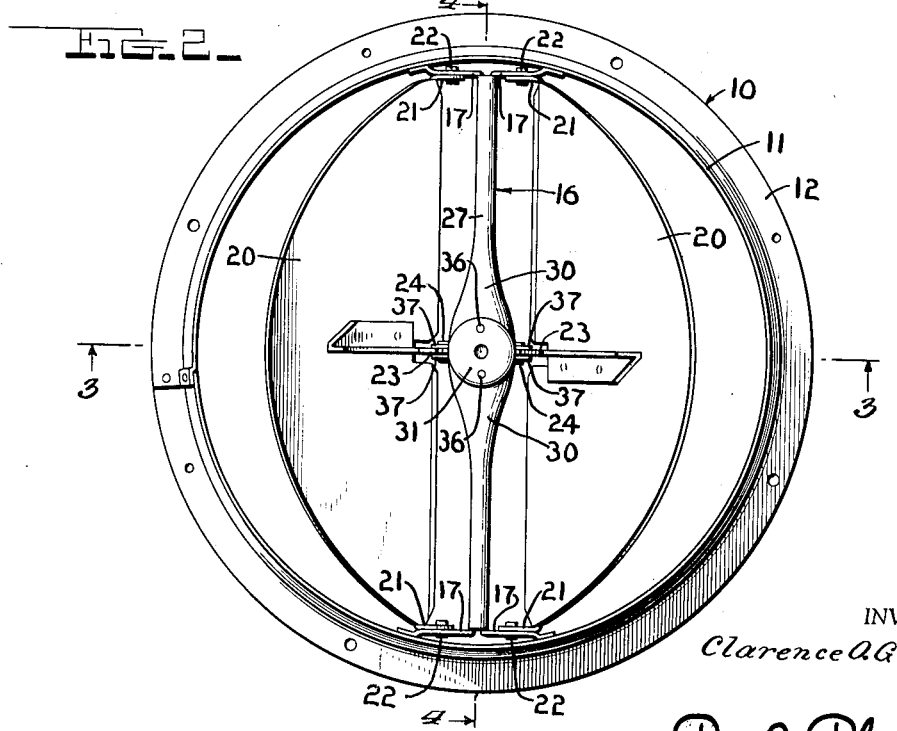
Figure 2 is a top plan view with the two butterfly dampers adjusted to an intermediate position; the grill being omitted from this view to avoid confusion.

A slender bar 16, Figures 1 and 2, diametrically spans the pipe connector 10 and is provided at each of its ends with lugs 17 each of which may be of either one or two piece construction as shown, and which project laterally in opposite directions. The outer ends of these lugs are secured to the pipe connector side wall 11. Preferably, said outer lug ends are offset outwardly and spot-welded at 18 as shown in Figure 3 to the side wall 11. The central portion of the bar 16 carries a depending bracket 19 for a purpose presently to appear.

Two semi-disk-shaped butterfly dampers 20, Figures 1 and 2, are located at opposite sides of the diametrical bar 16 to either close the spaces between said bar and the pipe connector 10 or to open said spaces partially or substantially fully, for flow of a gaseous fluid such as air. These dampers 20 are provided at their ends with lugs 21, which may well be integral therewith, and said lugs 21 are pivoted by rivets or the like 22 to the lugs 17 at the ends of the diametrical bar 16. Between their ends, the dampers 20 have toothed segments 23 suitably secured thereto, and these segments preferably have an angular extending portion fastened as by spot welding to dampers 20 to stiffen and brace same, said segments being pivoted at 24 to the bracket 19. A worm gear 25 is mounted vertically in this bracket and meshes with the two segments 23, and rotation of said worm gear will thus open or close the dampers 20, as required.

When the dampers 20 are fully open, as illustrated in Figure 1, they present practically no obstruction to air flow, and due to the very slender form of the diametrical bar 16, it likewise presents practically no air flow barrier. Then, too, the bracket 19 is so small and the segments 23 so thin that they set up practically no air flow resistance.

The diametrical bar 16, Figures 1 and 2, is preferably stamped from sheet metal in longitudinally channeled form. The side flanges of this channeled bar are denoted at 26, Figure 1, and its flange connecting portion at 27. The lugs 17 preferably have attaching legs 28 spot-welded at 29, Figure 4, between the ends of the side flanges 26.

The flange-connecting portion 27, Figure 2, of the channeled bar 16 is gradually widened toward its center as seen at 30. Centrally between the ends of this bar 16, Figure 4, the widened portion 30 is upwardly stamped to provide a flat plate 31 and a slight downward flange 32 at the periphery of said plate 31. The distance between the side flanges 26 gradually increases toward the plate 31, and restricted portions of the flange 32 are formed by the central portions of said side flanges 26. The plate 31 provides for the attachment of the bracket 19 and the flange 32 insures easy positioning of said bracket during manufacture.

The bracket 19 (inverted in Figure 5) is in the form of a sheet metal stamping. This stamping is of U-shape with the arms of the U formed by two spaced parallel side walls 33 connected at their lower ends by bights 34 and bent laterally outward at their upper ends to provide attaching flanges 35 for spot-welding at 36 to the central plate 31 of the diametrical bar 16. The longitudinal edges of the side walls 33 have projecting parallel apertured lugs 37 through which to pass the pivots 24 which connect the segments 23 with the bracket 19. These segments extend between the side walls 33 and between the lugs 37 and are by these elements held against axial shifting.

The side walls 33 are each provided with longitudinal outwardly stamped channeled portions 38 which jointly provide a vertical bearing in which the worm gear 25 is rotatably received. The bight portion 34 is formed with an opening 39 through which the worm gear 25 extends. At the upper ends 40 of the channeled portions 38, the side walls 33 and flanges 35 are jointly apertured at 41 to facilitate lateral bending of the flanges 35 without distorting said upper ends 40 of said channeled portions 38 and to leave these upper ends 40 free of connection with said flanges 35. The worm gear 25 is formed with a peripheral groove 42 opposite the upper ends 40 of the channeled portions 38, and after insertion of said worm gear until it abuts the plate 31 of the diametrical bar 16, it is rotatably anchored in place, for instance by having said ends 40 deformed inwardly into said groove 42, as seen in Figure 4. Thus, the worm gear 25 is held against longitudinal shifting in one direction by the ends 40, and in the other direction by the plate 31.

It will be seen from the above that the structure of the bracket 19 is simple, easily manufactured, provides effectively for mounting the worm gear 25, and provides for direct pivoting of the segments 23 to hold them against possible jumping out of mesh with said worm gear 25.

The lower end of the worm gear 25 may be shaped for engagement and operation by any preferred hand tool or may be provided with a knob or the like. In most views, this worm gear has a screw driver kerf 43 but in Figure 6 it is provided with a knob 44 which eliminates the snap-on decorative guard 45 shown in Figure 3.

From the foregoing it will be seen that a novel and advantageous double butterfly damper construction has been set forth for attaining the desired ends efficiently and attractively, but attention is again invited to the possibility of making variations within the spirit and scope of the invention as set forth. Then, too, while the invention has been described for its primary use as a ceiling outlet damper, it can well be used in other places such as in a side wall, floor, or even in exposed ductwork. The terms "upper," "lower," and "vertical" are also to be considered as explanatory and not limiting on the construction illustrated and described.

Other modes of applying the principle of my invention may be employed instead of those explained, change being made as regards the damper assembly and combinations herein disclosed, provided the means stated by any of the following claims or the equivalent of such stated means be employed.

I therefore particularly point out and distinctly claim as my invention:

1. A damper comprising a gaseous fluid conducting member, a diametrical bar with an enlarged central portion, said bar spanning and secured at its ends to said fluid conducting member, two butterfly dampers disposed at opposite sides of said diametrical bar, means pivotally mounting said dampers on parallel axes, two toothed segments secured to said dampers respectively, said segments being in alinement with each other substantially perpendicular to said diametrical bar and opposite said enlarged central portion of same, a single worm gear meshing with both of said segments, a separate pivot means for said dampers at the center of said toothed segments, said last named pivot means being in alinement with said first mentioned means pivotally mounting said dampers, and mounting means mounting said worm gear on said diametrical bar at said enlarged central portion of same.

2. A damper comprising a gaseous fluid conducting member, a diametrical bar spanning and secured at its ends to said fluid conducting member, two butterfly dampers disposed at opposite sides of said diametrical bar, means pivotally mounting said dampers on parallel axes, two toothed segments secured to said dampers respectively, a single worm gear meshing with both of said segments, and mounting means mounting said worm gear on said diametrical bar, each of said toothed segments having as an integral part of same an extending portion joined to the corresponding butterfly damper and extending a substantial distance across same for stiffening it and supporting said toothed segmental portion in upright position for pivotal movement of said damper member, and a separate pivot means for said dampers at the center of said segmental portions, said last named pivot means being in alinement with said first mentioned means pivotally mounting said dampers.

3. A damper comprising a gaseous fluid conducting member, a diametrical bar spanning and secured at its ends to said fluid conducting member, two butterfly dampers disposed at opposite sides of said diametrical bar, means pivotally mounting said dampers on parallel axes, two toothed segments secured to said dampers respectively, a single worm gear meshing with both of said segments, and mounting means mounting said worm gear on said diametrical bar, said diametrical bar having lugs at each end with said lugs having end portions projecting in opposite directions from said bar, said lugs being secured to said gaseous fluid conducting member, and said dampers being pivotally mounted on said lugs.

4. A damper comprising a gaseous fluid conducting member, a diametrical bar spanning and secured at its ends to said fluid conducting member, two butterfly dampers disposed at opposite sides of said diametrical bar, means pivotally mounting said dampers on parallel axes, two toothed segments secured to said dampers respectively, a single worm gear meshing with both of said segments, and mounting means mounting said worm gear on said diametrical bar, said diametrical bar being of channeled form and having lugs at each of its ends, said lugs having portions projecting sidewise in opposite directions from the ends of said bar and fastened to said fluid conducting member, said lugs also having attaching leg portions secured in the channel of said bar, said dampers being pivotally mounted on said lugs.

5. A damper comprising a gaseous fluid conducting member, a diametrical bar spanning and secured at its ends to said fluid conducting member, two butterfly dampers disposed at opposite sides of said diametrical bar, means pivotally mounting said dampers on parallel axes, two toothed segments secured to said dampers respectively, a single worm gear meshing with both of said segments, and mounting means mounting said worm gear on said diametrical bar, said mounting means comprising a bracket secured to said diametrical bar, said bracket having a bearing in which said worm gear is mounted, and pivots directly connecting said segments with said bracket to hold said segments in mesh with said worm gear.

6. A damper comprising a gaseous fluid conducting member, a diametrical bar spanning and secured at its ends to said fluid conducting member, two butterfly dampers disposed at opposite sides of said diametrical bar, means pivotally mounting said dampers on parallel axes, two toothed segments secured to said dampers respectively, a single worm gear meshing with both of said segments, and mounting means mounting said worm gear on said diametrical bar, said diametrical bar being of longitudinally channeled form, said longitudinally channeled bar having side flanges and a flange-connecting portion integrally connecting said side flanges, said flange-connecting portion having a widened portion constituting a relatively flat plate, said side flanges being spaced apart relatively widely contiguous to said plate, and a bracket secured to said plate and disposed between the widely spaced portions of said side flanges, said bracket constituting said mounting means for said worm gear.

7. In a damper assembly having a bar, two dampers disposed at opposite sides of said bar, means for pivotally supporting said dampers at the ends of said bar, two toothed segments secured respectively to said dampers at a position spaced from and between said means for pivotally supporting same, and a worm gear simultaneously meshing with the teeth of both of said segments; a single bracket secured to said bar and having a bearing in which said worm gear is mounted, and means directly pivoting said segments to said bracket to operably hold said segments in mesh with said worm gear, said first and last named pivot means of each damper being substantially alined to facilitate pivotal movement of same.

8. A structure as specified in claim 7; said bracket comprising two spaced apart side walls with a bight means connecting said side walls at one end, the other ends of said side walls being provided with lateral attaching flanges secured to said bar, said side walls having channeled portions jointly forming the bearing in which the aforesaid worm gear is rotatably mounted, said bight having an opening through which said worm gear extends accessibly, the spacing of said side walls being such that said segments can closely fit therebetween and be held thereby against axial shifting.

9. A structure as specified in claim 7; said bracket comprising two spaced apart side walls with a bight means connecting said side walls at one end, the other ends of said side walls being provided with lateral attaching flanges secured to said bar, said side walls having channeled portions jointly forming the bearing in which the aforesaid worm gear is rotatably mounted, said bight means having an opening through which said worm gear extends accessibly, the spacing of said side walls being such that said segments can closely fit therebetween and be held thereby against axial shifting, said means directly pivoting said segments to said bracket utilizing said side walls and a pivot means carried by them to hold said segments in mesh with said worm gear.

10. A structure as specified in claim 7; said bracket comprising two spaced apart side walls with a bight means connecting said side walls at one end, the other ends of said side walls being provided with lateral attaching flanges secured to said bar, said side walls having channeled portions jointly forming the bearing in which the aforesaid worm gear is rotatably mounted, said bight means having an opening through which said worm gear extends accessibly, the spacing of said side walls being such that said segments can closely fit therebetween and be held thereby against axial shifting, said worm gear having a peripheral groove, and means engaging said groove and said bracket for holding said worm gear in place and resisting end thrust on same.

11. A structure as specified in claim 7; said bracket comprising two spaced apart side walls with a bight means connecting said side walls at one end, the other ends of said side walls being provided with lateral attaching flanges secured to said bar, said side walls having channeled portions jointly forming the bearing in which the aforesaid worm gear is rotatably mounted, said bight means having an opening through which said worm gear extends accessibly, the spacing of said walls being such that said segments can closely fit therebetween and be held thereby against axial shifting, each of said segments further having an extending portion joined to the corresponding damper for stiffening same, said worm gear having a peripheral groove, at least one of said channeled bearing-forming portions of said side walls having a restricted portion inwardly deformed into said groove to resist end thrust of the worm gear.

12. A structure as specified in claim 7; said bracket comprising two spaced apart side walls with a bight means connecting said side walls at one end, the other ends of said side walls being provided with lateral attaching flanges secured to said bar, said side walls having channeled portions jointly forming the bearing in which the aforesaid worm gear is rotatably mounted, said bight means having an opening through which said worm gear extends accessibly, the spacing of said side walls being such that said segments can closely fit therebetween and be held thereby against axial shifting, said worm gear having a peripheral groove, at least one of said channeled bearing-forming portions of said side walls having a restricted portion inwardly deformed into said groove to resist end thrust of the worm gear in one direction, said worm gear abutting said diametrical bar to resist end thrust in the other direction.

References Cited in the file of this patent

UNITED STATES PATENTS

| 1,971,841 | Young | Aug. 28, 1934 |
| 2,104,279 | Sperry | Jan. 4, 1938 |
| 2,203,120 | Young | June 4, 1940 |
| 2,397,672 | Leigh | Apr. 2, 1946 |

FOREIGN PATENTS

| 1,640 | Sweden | Apr. 18, 1883 |